United States Patent [19]

Godett et al.

[11] Patent Number: 4,911,144

[45] Date of Patent: Mar. 27, 1990

[54] SPHERICAL SOLAR ENERGY COLLECTOR

[75] Inventors: Ted M. Godett; Roelf J. Meijer, both of Ann Arbor, Mich.

[73] Assignee: Stirling Thermal Motors, Inc., Ann Arbor, Mich.

[21] Appl. No.: 345,831

[22] Filed: May 1, 1989

[51] Int. Cl.<sup>4</sup> ............................................. F24J 2/32
[52] U.S. Cl. .................................................. 126/433
[58] Field of Search ...................... 126/433; 165/104.26

[56] References Cited

U.S. PATENT DOCUMENTS

| 4,335,578 | 6/1982 | Osborn et al. | 126/433 |
| 4,785,633 | 11/1988 | Meijer et al. | 126/433 |

Primary Examiner—Carroll B. Dority
Attorney, Agent, or Firm—Harness, Dickey & Pierce

[57] ABSTRACT

A solar collector particularly for receiving concentrated solar energy from a large parabolic reflector and which forms the evaporator of a heat pipe type heat transfer mechanism. The solar collector is formed from a pair of spherical shell portions which are joined at their perimeters such that they are nearly tangent at their joint. This configuration provides low mechanical stresses on the welded joint, making the structure resistant to creep failure. The inside surfaces of the solar collector are preferably covered with wire screens for the transport of liquid heat pipe working fluid. Various finenesses of mesh can be used. Preferably, a coarse mesh is in intimate contact with the inside surfaces of the collector to act as a transport medium with a finer mesh covering it. These mesh layers can be applied to surfaces of sheet metal blanks through sintering or other processes which are thereafter deformed to the desired shell configurations.

6 Claims, 1 Drawing Sheet

SPHERICAL SOLAR ENERGY COLLECTOR

BACKGROUND AND SUMMARY OF THE INVENTION

This invention relates to a solar energy collector and particularly to one comprising the evaporator of a heat pipe type heat transfer system.

For certain types of solar energy conversion systems radiant solar energy is concentrated onto a collector. This input heat is used to evaporate the working fluid within a heat pipe. In one application, the heat pipe is used to transfer heat to a Stirling cycle engine which can be used to drive an electrical generator or another load. In order to collect a significant amount of solar energy, a very large parabolic reflector is used which concentrates the radiant energy onto the collector. The collector is a hollow housing with a concave surface which receives the radiant energy. Significant design problems are encountered in the design and fabrication of solar energy collectors of this type since they are exposed to significant thermal stresses during operation and must withstand external atmospheric pressure forces since many heat pipe systems operate at internal pressures below atmospheric, for example, when sodium is used as a heat transfer material below 875° C. Particular structural problems occur at the joints between components of the collector housing.

This invention is directed to an improved solar energy collector of the type described previously having a configuration which minimizes mechanical stresses on the collector at its radially outer peripheral edge. The solar collector according to this invention further includes numerous layers of fine wire mesh which are in intimate contact with the inside surfaces of the hollow solar collector which serve to distribute heat pipe working fluid in the liquid state over the surfaces of the solar collector so that the liquid can be efficiently vaporized.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
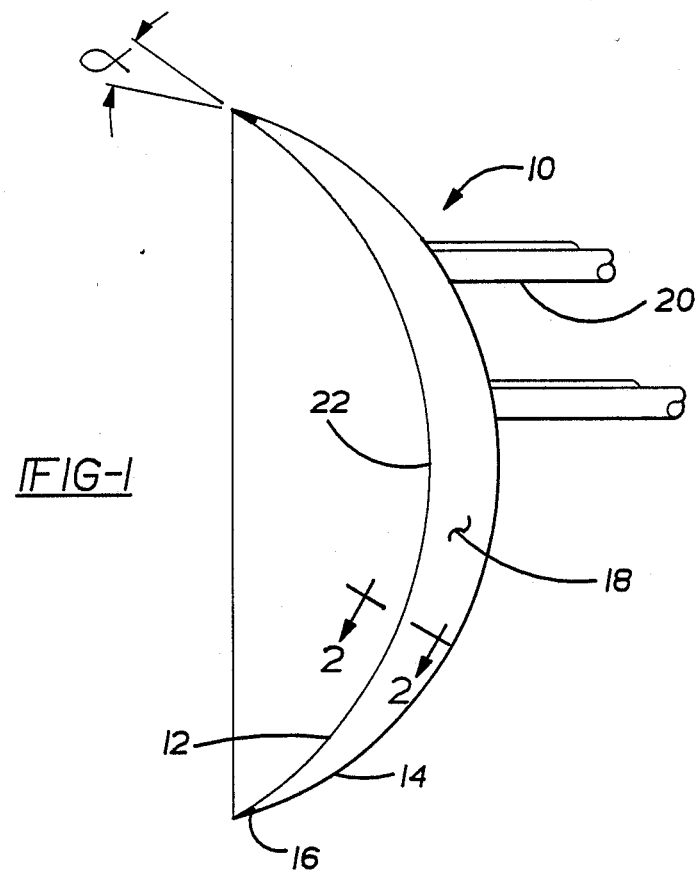
FIG. 1 is a cross-sectional view taken through a solar collector in accordance with this invention.

With reference with FIG. 1, a solar collector in accordance with this invention is shown and is generally designated by reference number 10. Solar collector 10 is adapted for use in collecting radiant energy which is concentrated onto it by a large parabolic reflector (not shown). Solar collector 10 is generally comprised of a pair of shell portions 12 and 14 having a spherical segment shape, or another concave surface of revolution. Shell portion 12 has a larger radius of curvature and forms the concave surface of the collector which receives radiant energy. A welded seam 16 around the perimeter of the device connects shells 12 and 14 in a fluid-tight manner.

Collector 10 acts as the evaporator of a heat pipe. The inside cavity 18 of solar collector 10 communicates with one or more heat pipe fluid transfer tubes 20 for the purpose of allowing a vaporized working fluid within inside cavity 18 to escape from collector 10 while permitting a return flow of liquid. During operation, the heat pipe working fluid enters solar collector 10 and is heated to point of vaporization and then is transferred to a utilization device such as a Stirling engine or other energy transfer or conversion apparatus.

Solar collector 10 is subjected to significant thermal gradients during operation, particularly during start up. In such conditions, the center area 22 of shell 12 becomes initially heated and expands before the remainder of solar collector 10 has reached its steady state operating temperature. Such thermal gradients within collector 10 produce deformation of the shell portions. Internal supports within collector 10 are not used since they could cause concentrated loadings and component buckling in response to such thermal gradients. In the steady state condition, the entire collector 10 reaches a near uniform temperature. In applications where sodium is used as a heat pipe working fluid at a temperature of about 800° C., the pressure within collector 10 is about one-half atmosphere. Due to this low pressure within collector 10, atmospheric pressure acts on the entire structure and imposes a load tending to cause collapse of the structure. These loads are particularly concentrated on the welded seam 16. Since the creep strength of the weld is considerably less than its tensile strength, and is further reduced by the high temperature of the collector, the welded seam becomes particularly susceptible to creep failure. It is, therefore, desirable to minimize stresses acting on welded seam 16.

In accordance with a primary feature of the present invention, shell sections 12 and 14 are configured such that they join at welded joint 16 to define an angle formed by lines tangent to the outer edge surfaces of the segments designated by the letter alpha of less than 60 degrees. The optimal configuration results if outer shell 14 is in the form of a cylinder which merges with an inner concave hemispherical shell forming a cone angle of zero degrees, i.e., the surfaces are tangent. Although this configuration would be optimal for structural characteristics, it is impractical since it would result in an excessively large collector.

Figure 2:
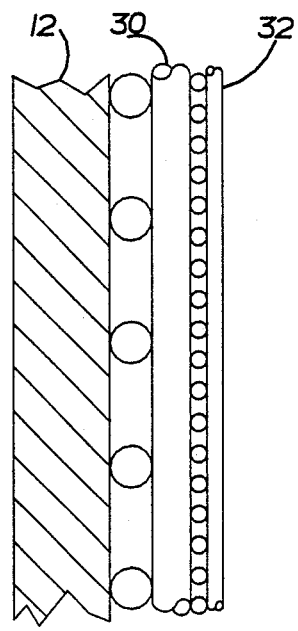
FIG. 2 is a partial cross-sectional view taken along line 2—2 of FIG. 1, particularly showing the wire mesh lining the inside surfaces of the collector.

Another principal feature of the invention is best shown with reference to FIG. 2. As shown in that figure, various layers of mesh material are used to distribute liquid heat pipe working fluid along the inside surfaces of solar collector 10 which provide for efficient vaporization in response to external heat inputs. As shown in FIG. 2, a coarse mesh screen 30 is applied directly against the inside surfaces of solar collector 10. A finer mesh screen 32 is applied over coarse layer 30. The fineness of the meshes defines their flow resistance an capillary pressure. Coarse screen 30 has a low flow resistance and low capillary pressure, thus making it an efficient conductor of quantities of liquid working fluid across the surfaces of receiver 10, thus acting as a liquid flow "artery". Fine mesh screen 32 provides higher flow resistance and more capillary pressure. Although the high flow resistance of fine screen 32 makes it less efficient for transporting liquid, its higher capillary pressure acts as a "pump" for distributing working fluid over the entire inside surface of collector 10. Numerous layers of screen of various fineness can be applied to accomplish the above objectives.

In a preferred fabrication process, the screen layers 30 and 32 are bonded to a flat sheet metal blank, for example, by sintering which is thereafter deformed to define spherical shells 12 and 14. This fabrication process avoids the difficulties of applying and bonding screen material to a curved shell surface. Screen layers 30 and 32 could be made of stainless steel mesh and could be molecularly bonded in vacuum conditions to shell blanks.

While the above description constitutes the preferred embodiments of the present invention, it will be appreciated that the invention is susceptible of modification, variation and change without departing from the proper scope and fair meaning of the accompanying claims.

We claim:

1. A solar energy collector which acts as an evaporator of a heat pipe comprising:

a first shell forming a concave energy collection surface, a second shell having a radius of curvature less than said first shell, said shells joined together only at their outer perimeter edges thereby defining an enclosed inside cavity free of internal structure mechanically coupling said shells together such that said shells are permitted to undergo flexure independent of one another in response to transient thermal conditions, said shells' perimeter edges defining a cone angle of less than 60 degrees, and working fluid transport pipes communicating with said collector for transporting liquid heat pipe working fluid to said collector and permitting vaporized working fluid to escape said collector.

2. A solar energy collector according to claim 1 wherein at least the inside surfaces of said first shell is covered with a wire mesh which serves to distribute liquid heat pipe working fluid, said wire mesh being of a sufficiently thin layer to prevent said wire mesh covering said first shell from mechanically engaging said second shell during said deformation.

3. A solar energy collector according to claim 2 wherein said inside surfaces have a first coarse layer or layers of mesh directly against said surface with a second finer mesh covering said first layer.

4. A solar energy collector according to claim 2 wherein said wire mesh is molecularly bonded to a sheet metal blank which is thereafter deformed to define one of said shells.

5. A solar energy collector according to claim 1 wherein said shells are joined by a weld joint.

6. A solar energy collector according to claim 1 wherein at least one of said shells have a spherical segment shape.

* * * * *